United States Patent
Jo et al.

(10) Patent No.: US 11,377,367 B2
(45) Date of Patent: Jul. 5, 2022

(54) METAL-DOPED COBALT PRECURSOR FOR PREPARING POSITIVE ELECTRODE ACTIVE MATERIAL FOR SECONDARY BATTERY

(71) Applicant: LG Chem, Ltd., Seoul (KR)

(72) Inventors: Chi Ho Jo, Daejeon (KR); Sungbin Park, Daejeon (KR); Jiyoung Park, Daejeon (KR); Bo Ram Lee, Daejeon (KR); Hyuck Hur, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/077,693

(22) Filed: Oct. 22, 2020

(65) Prior Publication Data

US 2021/0039959 A1    Feb. 11, 2021

Related U.S. Application Data

(62) Division of application No. 16/310,007, filed as application No. PCT/KR2017/015119 on Dec. 20, 2017, now Pat. No. 10,894,723.

(30) Foreign Application Priority Data

Dec. 21, 2016 (KR) .................. 10-2016-0175222

(51) Int. Cl.
*C01G 51/04* (2006.01)
*H01M 4/525* (2010.01)
(Continued)

(52) U.S. Cl.
CPC ............. *C01G 51/04* (2013.01); *C01G 51/42* (2013.01); *C01G 51/66* (2013.01);
(Continued)

(58) Field of Classification Search
CPC ........ C01G 51/42; C01G 51/66; C01G 51/04; C01P 2006/40; H01M 2004/027;
(Continued)

(56) References Cited

U.S. PATENT DOCUMENTS 10,243,208 B2   3/2019   Lee et al.
10,547,056 B2   1/2020   Zhu et al.
(Continued)

FOREIGN PATENT DOCUMENTS

CN   101694877 A   4/2010
CN   102142547 A   8/2011
(Continued)

OTHER PUBLICATIONS

Chinese Search Report for Application No. 201780042721.0 dated Apr. 25, 2021, pp. 1-3.
(Continued)

*Primary Examiner* — Mark Kopec
*Assistant Examiner* — Jaison P Thomas
(74) *Attorney, Agent, or Firm* — Lerner, David, Littenberg, Krumholz & Mentlik, LLP (57) ABSTRACT

Provided is a cobalt precursor for preparing a lithium cobalt oxide of a layered structure which is included in a positive electrode active material, wherein the cobalt precursor is cobalt oxyhydroxide (CoM'OOH) doped with, as dopants, magnesium (Mg) and M' different from the magnesium.

5 Claims, 5 Drawing Sheets

(51) Int. Cl.
*H01M 4/1315* (2010.01)
*C01G 51/00* (2006.01)
*H01M 4/02* (2006.01)

(52) U.S. Cl.
CPC ......... *H01M 4/1315* (2013.01); *H01M 4/525* (2013.01); *C01P 2006/40* (2013.01); *H01M 2004/027* (2013.01); *H01M 2004/028* (2013.01)

(58) Field of Classification Search
CPC ......... H01M 2004/028; H01M 4/1315; H01M 4/525; Y02E 60/10
See application file for complete search history.

(56) References Cited

U.S. PATENT DOCUMENTS

| | | | |
|---|---|---|---|
| 2002/0142221 A1* | 10/2002 | Nemoto | C01G 45/1221 429/223 |
| 2003/0211235 A1 | 11/2003 | Suh et al. | |
| 2012/0028134 A1 | 2/2012 | Kim et al. | |
| 2014/0087257 A1 | 3/2014 | Gopukumar et al. | |
| 2014/0329147 A1 | 11/2014 | Mitsumoto et al. | |
| 2015/0034865 A1 | 2/2015 | Park et al. | |
| 2015/0104704 A1* | 4/2015 | Kim | H01M 4/133 429/217 |
| 2016/0036043 A1 | 2/2016 | Dai et al. | |
| 2016/0156032 A1* | 6/2016 | Lee | H01M 4/525 252/182.1 |
| 2016/0181609 A1 | 6/2016 | Shin et al. | |
| 2017/0222211 A1 | 8/2017 | Ryu et al. | |
| 2018/0309123 A1* | 10/2018 | Jo | H01M 10/0525 |

FOREIGN PATENT DOCUMENTS

| | | |
|---|---|---|
| CN | 103904323 A | 7/2014 |
| EP | 1281673 A1 | 2/2003 |
| EP | 2314545 A1 | 4/2011 |
| KR | 100437340 B1 | 6/2004 |
| KR | 20100131430 A | 12/2010 |
| KR | 20110116094 A | 10/2011 |
| KR | 20140016730 A | 2/2014 |
| KR | 20140018137 A | 2/2014 |
| KR | 20140040673 A | 4/2014 |
| KR | 20150021008 A | 2/2015 |
| KR | 20150141254 A | 12/2015 |
| KR | 20160040116 A | 4/2016 |
| KR | 20160064881 A | 6/2016 |
| WO | 2004001278 A3 | 8/2004 |
| WO | 2009003573 A1 | 1/2009 |

OTHER PUBLICATIONS

Extended European Search Report including Written Opinion for Application No. EP17884840.4, dated Jul. 18, 2019, pp. 1-8.
Search report from International Application No. PCT/KR2017/015119, dated Mar. 30, 2018.

* cited by examiner

METAL-DOPED COBALT PRECURSOR FOR PREPARING POSITIVE ELECTRODE ACTIVE MATERIAL FOR SECONDARY BATTERY

CROSS-REFERENCE TO RELATED APPLICATIONS

This application is a divisional of U.S. application Ser. No. 16/310,007, filed Dec. 14, 2018, which is a national phase entry under 35 U.S.C. § 371 of International Application No. PCT/KR2017/015119, filed Dec. 20, 2017, which claims priority to Korean Patent Application No. 10-2016-0175222, filed Dec. 21, 2016, the disclosures of which are hereby incorporated by reference.

TECHNICAL FIELD

The present invention relates to a metal-doped cobalt precursor for preparing a positive electrode active material for a secondary battery.

BACKGROUND ART

In recent years, a demand for environment-friendly alternative energy sources has become an indispensable factor for the future, as the price increase of energy sources due to depletion of fossil fuels and the interest in environmental pollution are amplified. For this reason, a variety of electric power generation technologies such as nuclear power, solar power, wind power, tidal power, etc. have been continuously studied, and energy storage devices for more efficient use of generated energy have also been attracting much attention.

Particularly, as technology development and demands for mobile devices increase, demands for batteries as energy sources are rapidly increasing. Recently, use of a secondary battery as a power source for an electric vehicle (EV), a hybrid electric vehicle (HEV), etc. has been realized, and its application field has also been expanded to use as an auxiliary power source through a grid. Therefore, many researches on batteries meeting diverse demands have been conducted.

In terms of the shape of the battery, there are high demands for a prismatic type secondary battery and a pouch type secondary battery which have a thin thickness to be applicable in products such as a cellular phone, etc. In terms of materials, there are high demands for lithium secondary batteries such as a lithium ion battery and a lithium ion polymer battery which have advantages of high energy density, discharge voltage, and output power stability.

As a positive electrode material for the lithium secondary battery, $LiCoO_2$, a ternary system material (NMC/NCA), $LiMnO_4$, $LiFePO_4$, etc. is currently used. Of them, $LiCoO_2$ has problems in that cobalt is expensive and $LiCoO_2$ has low capacity at the same voltage, as compared with ternary system materials. Therefore, use of ternary system materials is gradually increasing in order to increase the capacity of secondary batteries.

However, $LiCoO_2$ has been widely used until now, because it has advantages of high rolling density, etc. To develop high-capacity secondary batteries, studies are conducted to increase an operating voltage.

In general, lithium cobalt oxide, for example, $LiCoO_2$ has an R-3m rhombohedral layered structure. In detail, the lithium cobalt oxide has a structure in which lithium, cobalt, and oxygen are regularly arranged in the form of O—Li—O—Co—O—Li—O—Co—O along a [111] crystal face of a rock salt structure and such a structure is also referred to as an O3-type layered structure.

In this regard, when the lithium cobalt oxide is included in a positive electrode active material, lithium ions are deintercalated from a crystal lattice of the lithium cobalt oxide when a lithium secondary battery including the positive active material is charged. In particular, as the charging voltage, specifically, the charging cutoff voltage is higher, the amount of lithium ions deintercalated from the crystal lattice of the lithium cobalt oxide increases. Accordingly, at a higher charging cut-off voltage, the layered structure of lithium cobalt oxide is more likely to undergo a phase transition due to changes in the crystal lattice structure.

More specifically, $LiCoO_2$ may maintain the O3-type layered structure (O3 phase) up to a charging voltage of 4.53 V based on lithium after charging is completed. However, when the charging voltage exceeds 4.53 V, the amount of lithium ions deintercalated from the crystal lattice of the lithium cobalt oxide increases, and as a result, a phase transition from the O3-type layered structure to an O1-type layered structure (O1 phase), in which Li is not present in the crystal lattice, may occur. Therefore, when the charging voltage exceeds 4.53 V, a phase transition from the O3-type layered structure to an H1-3-type layered structure (H1-3 phase) may occur, in which the O3-type layered structure and the O1-type layered structure coexist in the crystal lattice.

In this regard, the phase transitions from the O3-type layered structure to the H1-3-type layered structure and from the O3-type layered structure to the O1-type layered structure may be partially irreversible, and in the H1-3-type layered structure and the O1-type layered structure, lithium ions capable of being intercalated/deintercalated may decrease. Thus, when the phase transition occurs, the operating efficiency and the discharge rate and lifespan characteristics of the lithium battery may deteriorate drastically.

Particularly, according to the nature of lithium cobalt oxide, when lithium ions are reduced, the oxidation of $Co^{3+}$ ions to $Co^{4+}$ ions with a lower ionic radius occurs to cause an increase in structural stress, and as a result, the above problems are exacerbated.

Therefore, in order to prevent deterioration of the operating efficiency and the discharge rate and lifespan characteristics of the lithium battery at a high voltage of more than 4.53 V and to improve the performances, it is necessary to inhibit the phase transition of lithium cobalt oxide.

Accordingly, there is a high demand for a technology capable of fundamentally solve the above problems.

DISCLOSURE

Technical Problem

An object of the present invention is to solve the above-described problems of the prior art and the technical problems which have been demanded to be solved.

The present inventors have conducted intensive studies and various experiments, and as described below, they found that when a cobalt precursor is composed of cobalt oxyhydroxide (CoM'OOH) which is doped with, as dopants, magnesium (Mg) and M' different from the magnesium, and the cobalt precursor is used to prepare a positive electrode active material, the dopants doped into lithium cobalt oxide exhibit a particular average oxidation number, and as a result, a crystal lattice having excellent structural stability may be formed, oxidation of cobalt ions due to reduction of lithium ions in lithium cobalt oxide may be prevented to prevent a reduction of ionic radius and an increase in structural stress, and an irreversible phase transition and a structural change of the lithium cobalt oxide may be effectively prevented even at a charging voltage of higher than 4.53 V, thereby preventing deterioration of operating efficiency and discharge rate and lifespan characteristics of a secondary battery including the positive electrode active material and improving performances thereof, leading to the present invention.

Technical Solution

To achieve the above object, a cobalt precursor for preparing a positive electrode active material according to the present invention may be a cobalt precursor for preparing a lithium cobalt oxide of a layered structure which is included in the positive electrode active material, wherein the cobalt precursor may be cobalt oxyhydroxide (($Co_xMg_yM'_z$)OOH) (wherein x, y, and z satisfy the following weight ratio conditions: a content of x is in the range of 99 wt % to 99.8 wt % and a total content of y and z is in the range of 0.2 wt % to 1 wt %, when the sum of x, y, and z is regarded as 100 wt %; M' is one or more selected from the group consisting of Al, Ti, Mn, Zr, Ba, B, Ca, Ta, Mo, Nb, W, Sr and $PO_4$) which is doped with, as dopants, magnesium (Mg) and M' different from the magnesium.

Here, y and z are each essentially included in the range of more than 0 wt %. In other words, y and z may satisfy the following conditions: y and z may be each included in the range of more than 0 wt % and less than 1 wt %, specifically, 0.01 wt % to 0.99 wt %, and at the same time, the total content of y and z may be 0.2 wt % to 1 wt %. Hereinbelow, the contents of y and z are the same as described above.

The lithium cobalt oxide prepared using the precursor may be represented by the following Formula 1, wherein the precursor is doped with, as dopants, magnesium (Mg) and M' different from the magnesium; and the dopants have an average oxidation number of more than +2 to +2.5 or less in the lithium cobalt oxide:

$$Li_a(Co_xMg_yM'_z)O_2 \quad (1)$$

wherein a satisfies 0.95≤a≤1.05;

x, y, and z satisfy the following weight ratio conditions: a content of x is in the range of 99 wt % to 99.8 wt % and a total content of y and z is in the range of 0.2 wt % to 1 wt %, when the sum of x, y, and z is regarded as 100 wt %; and M' is one or more selected from the group consisting of Al, Ti, Mn, Zr, Ba, B, Ca, Ta, Mo, Nb, W, Sr, and $PO_4$.

Accordingly, the dopants having a particular oxidation number may be doped and placed at the cobalt position of a crystal lattice of lithium cobalt oxide, and therefore, the crystal lattice having excellent structural stability may be formed, oxidation of cobalt ions due to reduction of lithium ions in lithium cobalt oxide may be prevented to prevent a reduction of ionic radius and an increase in structural stress, and an irreversible phase transition and a structural change of the lithium cobalt oxide may be effectively prevented even at a charging voltage of higher than 4.53 V, thereby preventing deterioration of operating efficiency and discharge rate and lifespan characteristics of a secondary battery including the positive electrode active material and improving performances thereof.

When the average oxidation number of the dopants is +2 or less or more than +2.5 out of the above range, the ionic radius of the dopants is changed or the dopants do not have the average oxidation number corresponding to cobalt, and thus the dopants may not be easily doped and placed at the cobalt position of the crystal lattice of the lithium cobalt oxide. As a result, it is difficult to obtain the effects of preventing the irreversible phase transition and structural change of the lithium cobalt oxide and oxidation of cobalt ions due to the dopants having the particular average oxidation number.

Here, the average oxidation number may be determined by Equation of "[oxidation number of magnesium*number of mole of magnesium+oxidation number of M'*number of mole of M']/number of mole of magnesium+number of mole of M'".

In this regard, instead of doping the cobalt precursor with the dopants, if a lithium precursor and the cobalt precursor are doped with the dopants at the same time while being reacted with each other during preparation of lithium cobalt oxide, there is a possibility of competition between the dopants and the lithium ions while the dopants are doped and placed at the cobalt position of the crystal lattice of the lithium cobalt oxide. In this case, doping of the cobalt position with the dopants may not be easy.

Particularly, when the lithium precursor and the cobalt precursor are doped with the dopants at the same time while being reacted with each other during preparation of lithium cobalt oxide, at least three process conditions, such as respective contents of the lithium precursor, the cobalt precursor, and the dopants, must be considered in order to control the average oxidation number of the dopants.

However, when the cobalt precursor is preferentially doped with the dopants, only two process conditions, such as respective contents of the dopants and the cobalt precursor, need to be considered during the doping process. In addition, when the dopant-doped cobalt precursor is reacted with the lithium precursor to prepare lithium cobalt oxide, only two process conditions, such as respective contents of the cobalt precursor and the lithium precursor, need to be considered. Therefore, the number of variables to be considered in a single process step is reduced, which may facilitate the design of the process conditions and may effectively reduce a defect rate of a product.

Further, when the dopants are doped into the final lithium cobalt oxide, rather than the cobalt precursor at the precursor stage, doping of the cobalt position with the dopants may not be easy because of the crystal lattice structure already formed during the preparation of lithium cobalt oxide.

Meanwhile, the dopants may be magnesium (Mg) and (M') which is, different from the magnesium, one or more selected from the group consisting of Al, Ti, Mn, Zr, Ba, B, Ca, Ta, Mo, Nb, W, Sr and $PO_4$, wherein the magnesium may have the oxidation number of +2 and the other (M') excluding the magnesium may have the oxidation number of +2 or +3, and consequently, the average oxidation number of the dopants may be easily controlled in the range of more than +2 and +2.5 or less. Accordingly, the dopants may be controlled to have a similar ionic radius to that of the cobalt ion, and thus the dopants may have the average oxidation number corresponding to cobalt. As a result, the dopants may be appropriately doped and placed at the cobalt position of the crystal lattice of the cobalt precursor for the preparation of the lithium cobalt oxide.

In a specific embodiment, the lithium cobalt oxide may have a structure, in which the crystal structure is maintained in a charging range of more than 4.5 V and 4.8 V or less.

In this regard, the crystal structure may have O3 phase.

As described above, when a known lithium cobalt oxide is included in the positive electrode active material, the lithium cobalt oxide may maintain the O3-type layered structure (O3 phase) up to a charging voltage of 4.53 V after charging is completed. However, when the charging voltage is more than 4.52 V, the amount of lithium ions deintercalated from the crystal lattice of the lithium cobalt oxide increases, and as a result, a phase transition from the O3-type layered structure to an H1-3-type layered structure (H1-3 phase) may occur. According to the nature of lithium cobalt oxide, as lithium ions are reduced, the oxidation of $Co^{3+}$ ions to $Co^{4+}$ ions with a lower ionic radius occurs to cause an increase in structural stress, and as a result, the above problems are exacerbated. Ultimately, the operating efficiency and the discharge rate and lifespan characteristics of a lithium battery may be deteriorated drastically.

In contrast, when lithium cobalt oxide is prepared using the cobalt precursor according to the present invention, the dopants may be appropriately doped and placed at the cobalt position of the crystal lattice of the lithium cobalt oxide, because the dopants may have the average oxidation number of the particular range, and may be controlled to have a similar ionic radius to that of the cobalt ion, and thus the dopants may have the average oxidation number corresponding to cobalt. As a result, oxidation of the cobalt ions in the lithium cobalt oxide may be prevented and its structural stability may be improved, and therefore, the lithium cobalt oxide may maintain the crystal structure of O3 phase in a charging range of more than 4.5 V and 4.8 V or less, thereby effectively preventing deterioration of operating efficiency and the discharge rate and lifespan characteristics of a lithium battery.

Further, the lithium cobalt oxide may have no plateau at 4.55 V of initial charge/discharge profiles.

More specifically, a general lithium cobalt oxide may not maintain the crystal structure of O3 phase at 4.55 V of initial charge/discharge profiles and may undergo a phase transition to H1-3 phase. Thus, due to two phase reaction, a plateau occurs, in which the voltage of the battery maintains constant.

In contrast, the lithium cobalt oxide prepared by using the cobalt precursor according to the present invention may maintain the stable crystal structure of O3 phase, may not undergo two phase reaction, and may maintain a stable charge/discharge state, and accordingly, the lithium cobalt oxide may not have a plateau, in which the voltage of the battery maintains constant, at 4.55 V of initial charge/discharge profiles.

Meanwhile, the positive electrode active material may be in the form of particles, and the surface of the particle may be coated with $Al_2O_3$.

Generally, when a high voltage of to 4.5 V or more is applied to lithium cobalt oxide, there are problems in that Li usage of $LiCoO_2$ is increased to make the surface unstable, and side reactions with an electrolyte occur to generate gas, resulting in a reduction of safety such as a swelling phenomenon, etc., an increase of possibility of structural instability, and a rapid reduction of lifespan characteristics.

For this reason, when the positive electrode active material including the lithium cobalt oxide prepared using the cobalt oxide according to the present invention is coated with $Al_2O_3$ on the particle surface thereof, reactivity of the particle surface of the positive electrode active material with respect to an electrolyte may be inhibited, side-reactions caused thereby may suppressed, and safety and lifespan characteristics may be further improved.

In this regard, the $Al_2O_3$ may be applied at a thickness of 0.2% to 5%, based on a diameter of the positive electrode active material particle.

When the coating thickness of $Al_2O_3$ is too thin out of the above range, it is difficult to achieve the desired effects. On the contrary, when the coating thickness of $Al_2O_3$ is too thick out of the above range, the capacity of the positive electrode active material may be reduced.

Further, the present invention provides a method of preparing the lithium cobalt oxide using the cobalt precursor, the method including:

(a) a process of preparing the cobalt precursor which is doped with dopants provided from a doping precursor by co-precipitation reaction of a cobalt acid salt and the doping precursor; and (b) a process of mixing the dopant-doped cobalt precursor and a lithium precursor, followed by heat treatment.

In other words, the lithium cobalt oxide may be prepared by reacting the dopant-doped cobalt precursor with the lithium precursor after doping the cobalt precursor with the dopants. Accordingly, in the lithium cobalt oxide, process variables to be considered may be minimized without competition between the dopants and the lithium ions for the cobalt position, and therefore, the average oxidation number of the dopants in the lithium cobalt oxide may be easily controlled within the desired range.

In this case, the doping precursor may be mixed such that a content of the cobalt is in the range of 99 wt % to 99.8 wt %, and a total content of the dopants is in the range of 0.2 wt % to 1 wt %, when the sum of the cobalt and the dopants is regarded as 100 wt %.

When the content of the dopants is too high out of the above range, the content of the cobalt in the lithium cobalt oxide may be decreased to lower the capacity of the lithium cobalt oxide.

Therefore, the doping precursor may be mixed such that the content of the cobalt is in the range of 99 wt % to 99.8 wt %, and the total content of the dopants is in the range of 0.2 wt % to 1 wt %, when the sum of the cobalt and the dopants is regarded as 100 wt %, thereby preventing reduction in the capacity of the lithium cobalt oxide according to doping of the dopants.

On the contrary, when the content of the dopant is too low, it is difficult to achieve the effect of improving structural stability according to doping of the dopants.

In a specific embodiment, the heat treatment of the process (b) may be performed at 950° C. to 1100° C. for 8 hours to 15 hours.

When the heat treatment of the process (b) is performed at an excessively low temperature or for a too short time out of the above range, the reaction between the cobalt and the lithium is not enough to form the stable lithium cobalt oxide.

On the contrary, when the heat treatment of the process (b) is performed at an excessively high temperature or for a too long time out of the above range, the lithium cobalt oxide particle become too large, which may influence performances of the lithium cobalt oxide or may cause a change in physical, chemical properties.

In a specific embodiment, the cobalt acid salt may be cobalt oxyhydroxide (CoOOH).

Further, the lithium precursor may be one or more selected from the group consisting of $Li_2CO_3$, LiOH, $LiNO_3$, $CH_3COOLi$, and $Li_2(COO)_2$.

Meanwhile, the doping precursor may be one or more selected from the group consisting of a mixed metal of Mg and one or more selected from the group consisting of Al, Ti, Mn, Zr, Ba, B, Ca, Ta, Mo, Nb, W, Sr, and P, a metal oxide thereof, and a metal salt thereof.

However, the lithium precursor or the doping precursor is not limited thereto, and the kind thereof is not limited as long as it may be used to prepare lithium cobalt oxide capable of maintaining a stable structure without deterioration of performances of the positive electrode active material.

Meanwhile, the cobalt precursor according to the present invention may be a cobalt precursor for preparing lithium cobalt oxide of the layered structure which is included in the positive electrode active material, wherein the cobalt precursor is cobalt oxyhydroxide (($Co_xMg_yM'_z$)OOH) doped with, as dopants, magnesium (Mg) and M' different from the magnesium; and the lithium cobalt oxide is represented by the following Formula 1;

the dopants have an average oxidation number of more than +2 and +2.5 or less in the lithium cobalt oxide; and the lithium cobalt oxide may have a structure in which a ratio (IO3/IH1-3) of a peak intensity of O3 phase to a peak intensity of H1-3 phase is more than 1 in the spectrum of X-ray diffraction (XRD) analysis using Cu-Kα:

$$Li_a(Co_xMg_yM'_z)O_2 \quad (1)$$

wherein a satisfies 0.95≤a≤1.05;

x, y, and z satisfy the following weight ratio conditions: a content of x is in the range of 99 wt % to 99.8 wt % and a total content of y and z is in the range of 0.2 wt % to 1 wt %, when the sum of x, y, and z is regarded as 100 wt %; and M' is one or more selected from the group consisting of Al, Ti, Mn, Zr, Ba, B, Ca, Ta, Mo, Nb, W, Sr, and $PO_4$.

Therefore, the lithium cobalt oxide may maintain the stable crystal structure of O3 phase even at a charging voltage of higher than 4.53 V, thereby preventing deterioration of operating efficiency and discharge rate and lifespan characteristics of a secondary battery and achieving excellent performances.

Meanwhile, the present invention provides a secondary battery including a positive electrode including the lithium cobalt oxide, a negative electrode, and an electrolyte. The kind of the secondary battery is not particularly limited, but specific example thereof may include lithium secondary batteries having advantages of high energy density, discharge voltage, output stability, etc., such as a lithium ion battery, a lithium ion polymer battery, etc.

Generally, the lithium secondary battery consists of a positive electrode, a negative electrode, a separator, and a non-aqueous electrolyte containing lithium salts.

The positive electrode may be fabricated by, for example, applying a mixture of the positive electrode active material, a conductive material, and a binder onto a positive electrode collector, followed by drying. If necessary, a filler may be further added to the mixture.

The conductive material is generally added in an amount of 1 wt % to 30 wt % based on the total weight of the mixture including the positive electrode active material. The conductive material is not particularly limited, as long as it has conductivity without causing chemical changes in the battery. Examples of the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc.

The binder is a component that assists in bonding between the active material and the conductive material and bonding with respect to the collector, and may be generally added in an amount of 1% by weight to 30% by weight based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

The filler is a component optionally used to inhibit expansion of the positive electrode. The filler is not particularly limited, as long as it is a fibrous material without causing chemical changes in the corresponding battery. For example, olefinic polymers such as polyethylene, polypropylene, etc.; and fibrous materials such as glass fibers, carbon fibers, etc. may be used.

The negative electrode may be fabricated by applying a negative electrode active material onto a negative electrode collector, followed by drying. If necessary, the above-described components may be further included, optionally.

The negative electrode active material may include, for example, carbon such as non-graphitized carbon, graphitized carbon, etc.; metal composite oxides such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group I, II, or III elements of the periodic table, halogen; 0≤x≤1; 1≤y≤3; 1≤z≤8), etc.; lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, etc.; conductive polymers such as polyacetylene, etc.; Li—Co—Ni-based materials, etc.

The separator and separation film are interposed between the positive electrode and the negative electrode, and an insulating thin film having high ion permeability and mechanical strength is used. The separator generally has a pore diameter of 0.01 μm to 10 μm and a thickness of 5 μm to 300 μm. As the separator, for example, a sheet or non-woven fabric made of olefin polymer, such as polypropylene having chemical resistance and hydrophobicity, etc.; or a glass fiber or polyethylene is used. When a solid electrolyte such as a polymer, etc. is employed as the electrolyte, the solid electrolyte may also serve as both the separator and the electrolyte.

Further, in one specific embodiment, in order to improve safety of the battery of high energy density, the separator and/or the separation film may be an organic/inorganic composite porous SRS (Safety-Reinforcing Separators).

The SRS separator may be manufactured by applying an active layer, including inorganic particles and a binder polymer, onto a polyolefin-based separator substrate. In this case, the SRS separator has a pore structure which is included in the separator substrate as well as a uniform pore structure which is formed by the interstitial volume among inorganic particles as active layer ingredients.

Compared to use of a common separator, use of the organic/inorganic composite porous separator is advantageous in that increase of the battery thickness according to swelling during a formation process may be inhibited. In the case where a gellable polymer is used as a binder polymer component when a liquid electrolyte is impregnated, the organic/inorganic composite porous separator may also serve as an electrolyte.

Further, since the organic/inorganic composite porous separator may exhibit excellent adhesion property by controlling the contents of inorganic particles and binder polymer which are active layer components present in the separator, a battery assembly process may be easily performed.

The inorganic particles are not particularly limited, as long as they are electrochemically stable. That is, the inorganic particles that may be used in the present invention are not particularly limited, as long as the inorganic particles are not oxidized and/or reduced within an operating voltage range (e.g., 0 to 5 V based on $Li/Li^+$) of a battery to which inorganic particles are applied. In particular, when inorganic particles having ion transfer ability are used, it is possible to improve ion conductivity in an electrochemical element, thereby improving the performance of the battery. Accordingly, it is preferable that ion conductivity of the inorganic particles is as high as possible. In the case of inorganic particles having high density, there is a difficulty in dispersing the inorganic particles at the time of coating, and there is a problem that the weight of the battery may increase. For these reasons, it is preferable that density of the inorganic particles is as low as possible. Additionally, in the case of inorganic particles having high permittivity, a degree of dissociation of electrolyte salts, such as lithium salts, in a liquid electrolyte may increase, thereby improving ion conductivity of the electrolyte.

The lithium salt-containing non-aqueous electrolyte is composed of a polar organic electrolyte and lithium salt. A non-aqueous liquid electrolyte, an organic solid electrolyte, or an inorganic solid electrolyte may be used as the electrolyte.

The non-aqueous liquid electrolyte may be, for example, a non-protic organic solvent, such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium salts are substance that are readily dissolved in the non-aqueous electrolyte, and may include, for example, LiCl, LiBr, LiI, $LiCO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added to the non-aqueous electrolyte. Optionally, halogen-containing solvents such as carbon tetrachloride or ethylene trifluoride may be further added in order to provide flame resistance, or carbon dioxide gas may be further added in order to enhance high-temperature retention properties.

Effect of the Invention

As described above, a cobalt precursor according to the present invention is composed of cobalt oxyhydroxide (CoOOH) which is doped with, as dopants, magnesium (Mg) and M' different from the magnesium, and the dopants doped into lithium cobalt oxide of a positive electrode active material prepared using the cobalt precursor exhibit a particular average oxidation number, and as a result, a crystal lattice having excellent structural stability may be formed, oxidation of cobalt ions constituting the lithium cobalt oxide may be prevented to prevent a reduction of ionic radius and an increase in structural stress, and an irreversible phase transition and a structural change of the lithium cobalt oxide may be effectively prevented even at a charging voltage of higher than 4.53 V, thereby preventing deterioration of operating efficiency and discharge rate and lifespan characteristics of a secondary battery including the positive electrode active material and improving performances thereof.

DETAILED DESCRIPTION OF THE EMBODIMENTS

Hereinafter, the present invention will be described in more detail with reference to Examples. However, the scope of the present invention is not intended to be limited by these Examples.

Preparation of Positive Electrode Active Material

Example 1

Each of $Mg(SO_4)$, $Al(SO_4)_3$, and $Co(SO_4)$ was added to an aqueous solution along with NaOH and $NH_4OH$ according to a stoichiometric ratio thereof such that Mg and Al were included in an amount of 3000 ppm and 2000 ppm, respectively, based on the total weight of lithium cobalt oxide, and co-precipitation was allowed to prepare a cobalt precursor (Co—Mg—Al)OOH (a total content of dopants: 0.5 wt %) doped with Mg and Al.

The cobalt precursor was mixed with $Li_2CO_3$ at a Li/M ratio of 1.02, and then sintered in a furnace at 1050° C. for 10 hours to prepare a lithium cobalt oxide $Li_{1.02}$(Co—Mg—Al)$O_2$ (a total content of dopants: 0.5 wt %) doped with Mg and Al at the cobalt position thereof.

Example 2

A cobalt precursor (Co—Mg—Al)OOH (a total content of dopants: 0.2 wt %) doped with Mg and Al was prepared in the same manner as in Example 1, except that Mg and Al were included in an amount of 1000 ppm and 1000 ppm, respectively, based on the total weight of lithium cobalt oxide in Example 1. This cobalt precursor was used to prepare a lithium cobalt oxide.

Example 3

A cobalt precursor (Co—Mg—Al)OOH (a total content of dopants: 1 wt %) doped with Mg and Al was prepared in the same manner as in Example 1, except that Mg and Al were included in an amount of 4000 ppm and 6000 ppm, respectively, based on the total weight of lithium cobalt oxide in Example 1. This cobalt precursor was used to prepare a lithium cobalt oxide.

Comparative Example 1

A lithium cobalt oxide $Li_{1.02}CoO_2$ was prepared using CoOOH and LiOH in the same amounts as in Example 1, except that Mg and Al were not included.

Comparative Example 2

200 g of the lithium cobalt oxide $Li_{1.02}CoO_2$ prepared in Comparative Example 1 was dry-mixed with 0.995 g of MgO and 1.55 g of $Al_2O_3$ such that Mg and Al were included in an amount of 3000 ppm and 2000 ppm, respectively, based on the total weight of lithium cobalt oxide. Then, the mixture was sintered in a furnace at 500° C. for 5 hours to prepare a lithium cobalt oxide coated with magnesium oxide and aluminum oxide on the surface thereof.

Comparative Example 3

0.995 g of MgO, 1.55 g of $Al_2O_3$, 200 g of CoOOH, and 79.5 g of $Li_2CO_3$ were dry-mixed with each other such that Mg and Al were included in an amount of 3000 ppm and 2000 ppm, respectively, based on the total weight of lithium cobalt oxide. Then, the mixture was sintered in a furnace at 1050° C. for 10 hours to prepare a lithium cobalt oxide $Li_{1.02}(Co—Mg—Al)O_2$ (a total content of dopants: 0.5 wt %) doped with Mg and Al at the cobalt position thereof.

Comparative Example 4

A lithium cobalt oxide $Li_{1.02}(Co—Mg—Al)O_2$ (a total content of dopants: 0.13 wt %) was prepared in the same manner as in Example 1, except that Mg and Al were included in an amount of 500 ppm and 800 ppm, respectively, based on the total weight of lithium cobalt oxide.

Manufacture of Secondary Battery

Each of the positive electrode active materials prepared in Examples 1 to 3, and Comparative Examples 1 to 4, a PVdF binder, and a natural graphite conductive material were mixed well at a weight ratio of 96:2:2 (positive electrode active material: binder: conductive material) in NMP, and then applied to an Al foil having a thickness of 20 m, and dried at 130° C. to manufacture each positive electrode. As a negative electrode, a lithium foil was used, an electrolyte containing 1M $LiPF_6$ in a solvent of EC:DMC:DEC=1:2:1 was used to manufacture each coin-type half cell.

Experimental Example 1

Analysis of Capacity Retention Ratio

From the coin-type half cells as manufactured above, the coin-type half cells including each of the positive electrode active materials of Examples 1 to 3 and Comparative Examples 1 to 4 were charged at 0.5 C to an upper voltage limit of 4.55 V at 25° C., and then discharged at 1.0 C to a lower voltage limit of 3 V. This procedure was regarded as 1 cycle, and capacity retention ratios after 50 cycles were measured. The results of measuring the capacity retention ratios of Example 1 and Comparative Examples 1 to 4 are shown in FIG. 1A, and the results of Examples 2 and 3 are shown in FIG. 1B.

Figure 1A:
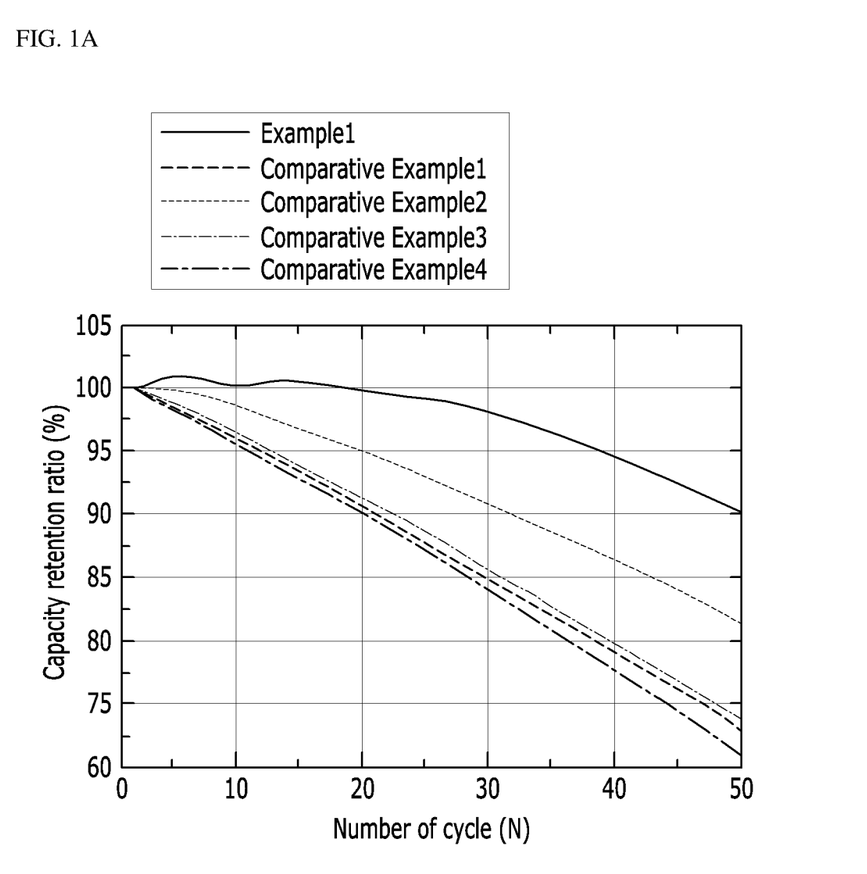
FIGS. 1A and 1B show graphs of capacity retention ratios of Example 1 and Comparative Examples 1-4 according to the tests conducted in Experimental Example 1.
Figure 1B:
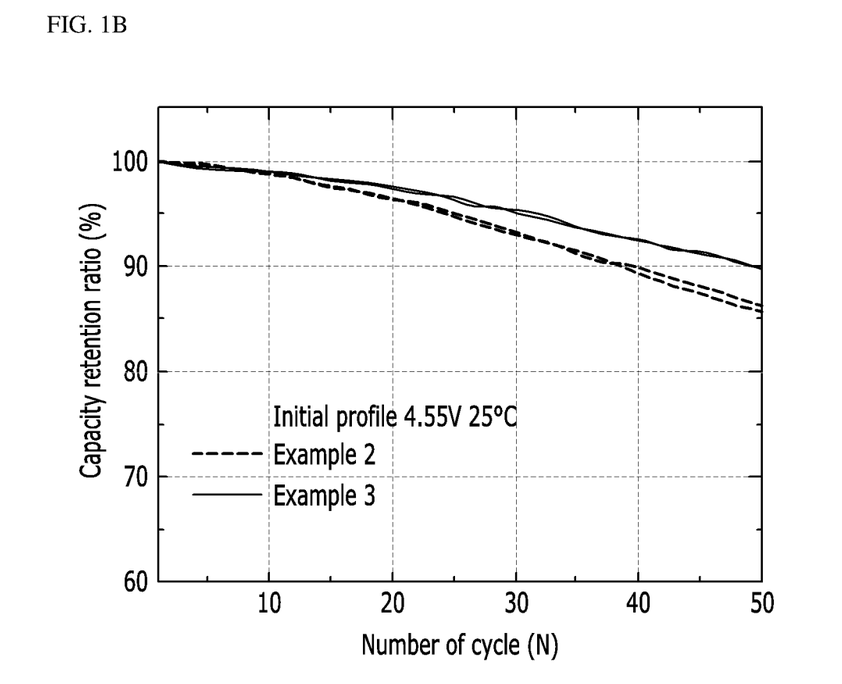

Referring to FIG. 1A, when Mg and Al were doped in an amount of 3000 ppm and 2000 ppmm, respectively as in Example 1, the coin-type half cell manufactured using the positive electrode active material of Example 1 showed a capacity retention ratio similar to the coin-type half cells manufactured using the positive electrode active materials of Comparative Examples 1 to 4, after less than about 50 cycles. However, over 50 cycles, Example 1 showed more excellent capacity retention ratio. Further, referring to FIG. 1B, in Examples 2 and 3, even though the doping amounts of Mg and Al were controlled within the range of the present invention, excellent capacity retention ratio equivalent to that of Example 1 was observed.

Accordingly, when the contents of the dopants are controlled in the positive electrode active material according to the present invention, the average oxidation number of the dopants in the lithium cobalt oxide may be controlled within the desired range, thereby achieving improved lifespan characteristic at a high voltage of 4.5 V or more.

Experimental Example 2

XRD Analysis

In order to examine changes in the crystal structures of the lithium cobalt oxides of Example 1 and Comparative Examples 1, 3 and 4, coin-type half cells including the same were manufactured, and peak intensity was measured while increasing the upper limit voltage from 4.53 V to 4.55 V at 0.01 V intervals. The XRD graphs (2-theta-scale) thus measured are shown in FIGS. 2 and 3.

Figure 2:
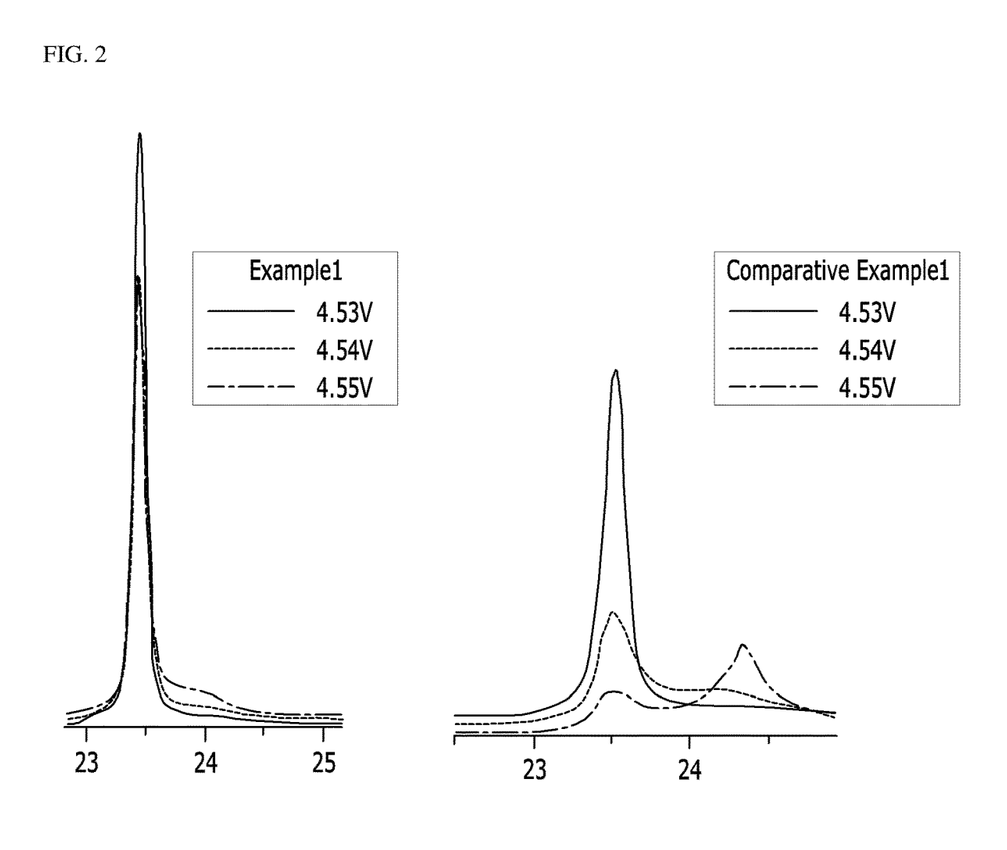
FIGS. 2 and 3 show XRD graphs of peak intensities of Example 1 and Comparative Examples 1, 3 and 4 according to the tests conducted in Experimental Example 2.
Figure 3:
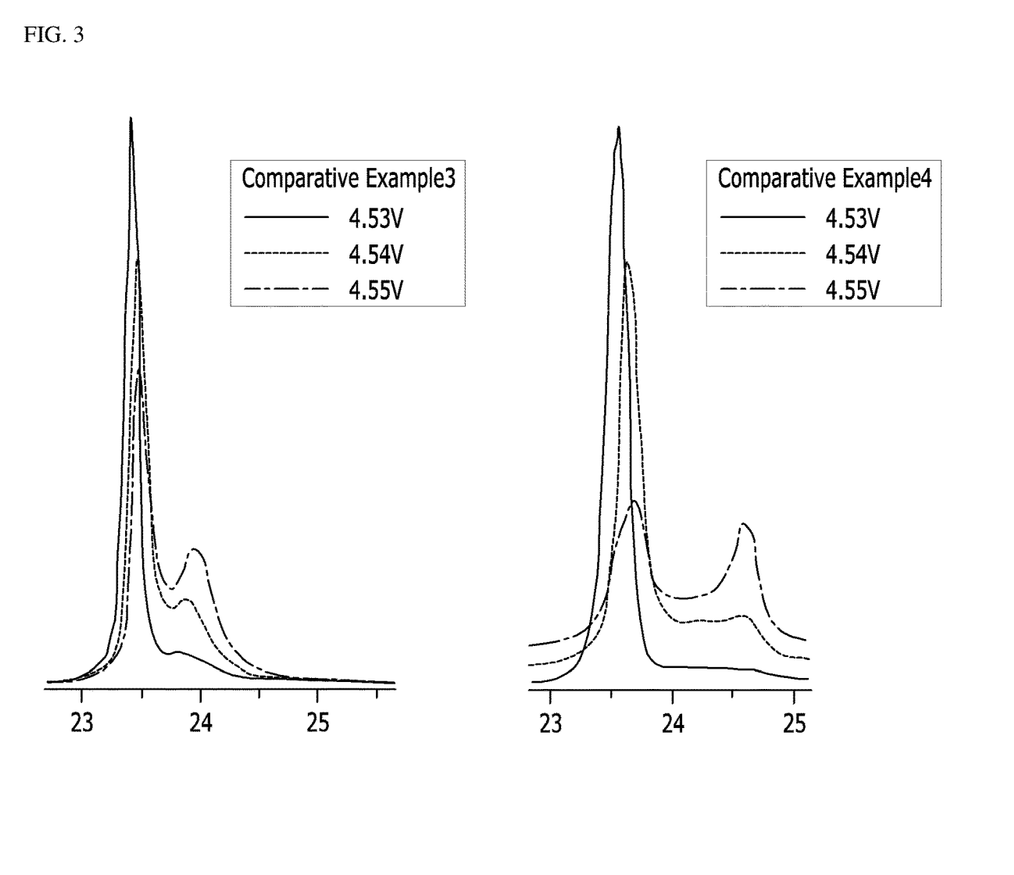

Referring to FIGS. 2 and 3, the positive electrode active material of Example 1 showed a peak in the range of 23 to 24 degree even at 4.55 V, and a peak intensity of (003) plane at 4.55 V was 70% or more of a peak intensity of (003) plane at 4.53 V. Even at the high voltage, there was no phase transition of the lithium cobalt oxide or no collapse of the crystal structure, indicating improvement of structural stability. However, the positive electrode active materials of Comparative Examples 1, 3 and 4 showed remarkably low peak intensities of (003) plane at 4.55 V, indicating that the phase transition of the lithium cobalt oxides or collapse of the crystal structures occurred.

Experimental Example 3

Discharge Rate Analysis

From the coin-type half cells as manufactured above, the coin-type half cells including each of the positive electrode active materials of Example 1 and Comparative Example 1 were initially charged at 0.5 C to an upper voltage limit of 4.55 V at 25° C., and then initially discharged at 1.0 C to a lower voltage limit of 3 V. Thereafter, discharge rates were measured and the results are shown in FIG. 4.

Figure 4:
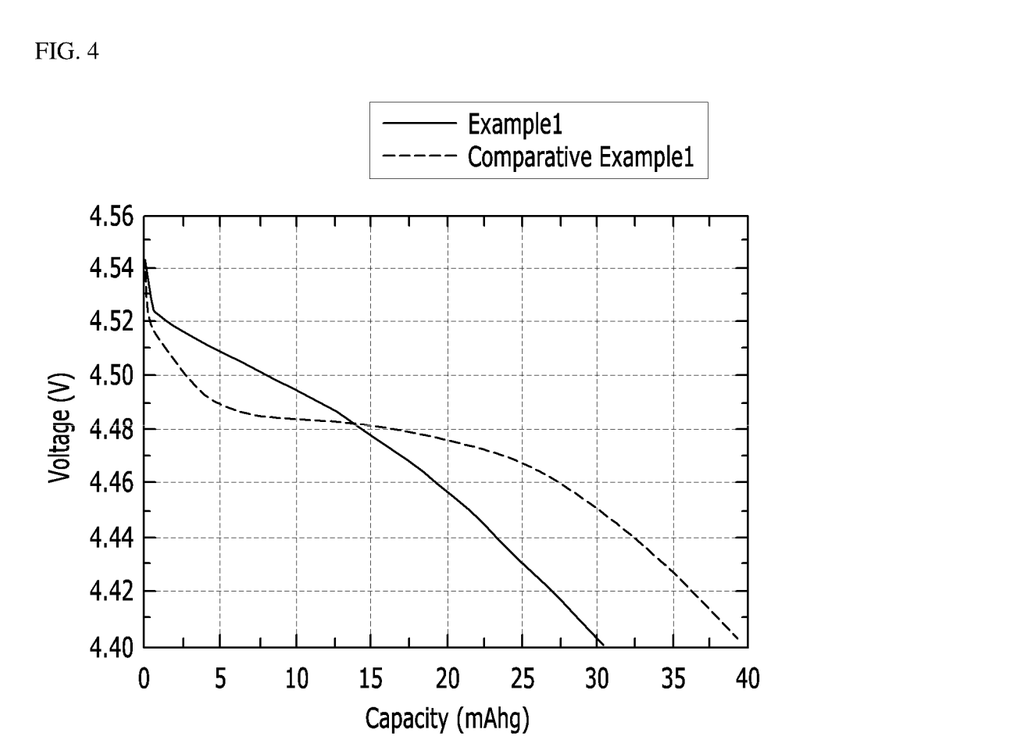
FIG. 4 shows a graph of a discharge rate of Example 1 and Comparative Example 1 according to the tests conducted in Experimental Example 3.

Referring to FIG. 4, when Mg and Al were doped in an amount of 3000 ppm and 2000 ppmm, respectively as in Example 1, the crystal structure of the lithium cobalt oxide was stably maintained, and the discharge rate was mostly constant, and therefore, a plateau, in which the voltage maintains constant, was not observed. However, Comparative Example 1 including no Mg and Al showed a rapid change in the discharge rate due to phase transition of the lithium cobalt oxide, and therefore, a plateau, in which the voltage maintains constant, was observed.

Although the present invention has been described in connection with the exemplary embodiments of the present invention, it will be apparent to those skilled in the art to which the present invention pertains that various modifications and changes may be made thereto without departing from the scope of the invention.

The invention claimed is:

1. A lithium cobalt oxide having a layered structure for a positive electrode active material, wherein the lithium cobalt oxide is represented by the following Formula 1, and doped with, as dopants, magnesium (Mg) and M'; and the dopants have an average oxidation number of more than +2 to +2.5 or less in the lithium cobalt oxide:

$$Li_a(Co_xMg_yM'_z)O_2 \quad (1)$$

wherein a satisfies 0.95≤a≤1.05;

x, y, and z satisfy the following weight ratio conditions:
a content of x is in the range of 99 wt % to 99.8 wt % and a total content of y and z is in the range of 0.2 wt % to 1 wt %, when the sum of x, y, and z is regarded as 100 wt %; and M' is one or more selected from the group consisting of Al, Ti, Mn, Zr, Ba, B, Ca, Ta, Mo, Nb, W, Sr, and $PO_4$, wherein the positive electrode active material is in the form of particles, and the surface of the particle is coated with $Al_2O_3$, and wherein the $Al_2O_3$ is applied at a thickness of 0.2% to 5% of a diameter of the positive electrode active material particle.

2. The lithium cobalt oxide of claim 1, wherein the lithium cobalt oxide maintains a crystal structure in a charging range of more than 4.5 V and 4.8 V or less.

3. The lithium cobalt oxide of claim 2, wherein the crystal structure is O3 phase.

4. The lithium cobalt oxide of claim 2,
wherein the lithium cobalt oxide has a structure in which a ratio of a peak intensity of O3 phase to a peak intensity of H1-3 phase is more than 1 in the spectrum of X-ray diffraction (XRD) analysis using Cu-Kα.

5. The lithium cobalt oxide of claim 1, wherein the lithium cobalt oxide has no plateau in voltage when discharged from 4.55 V to 3.0 V at a rate of 1.0 C.

* * * * *